Sept. 8, 1942.     E. L. MACK     2,295,488
FASTENER
Filed April 23, 1942
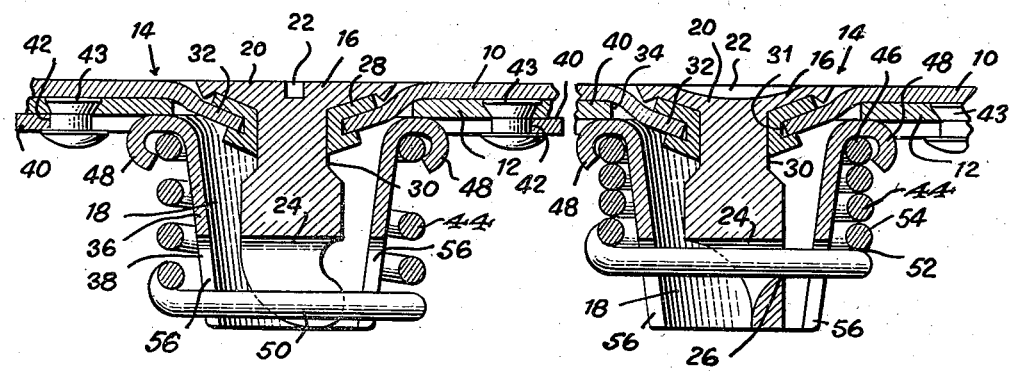
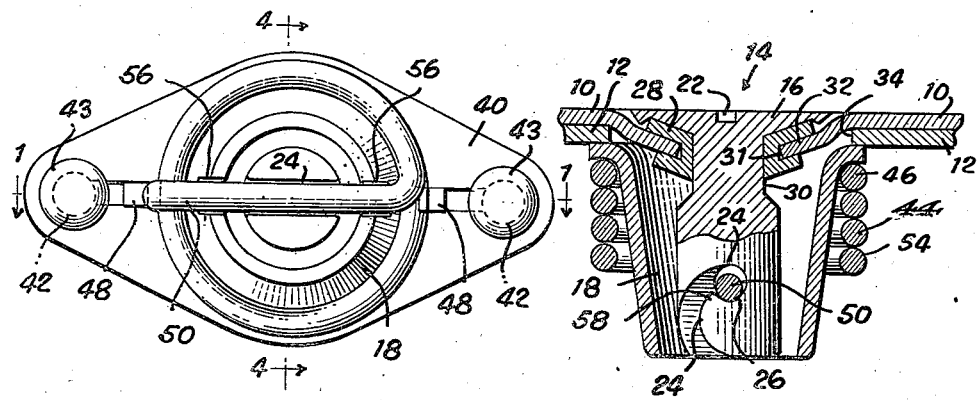
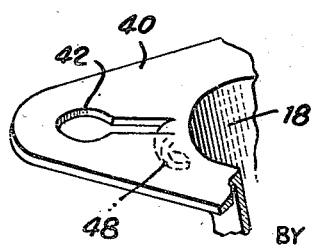
INVENTOR
Edward L. Mack
BY
ATTORNEY Patented Sept. 8, 1942

2,295,488

UNITED STATES PATENT OFFICE 2,295,488

FASTENER

Edward L. Mack, New York, N. Y.

Application April 23, 1942, Serial No. 440,127

10 Claims. (Cl. 24—221)

This invention relates generally to a new and improved fastening device adapted for detachably fastening together two separate parts or sheets of material, and the invention particularly relates to an improved airplane cowl fastener, or fastener adapted to serve in a related manner for holding readily detachable sheet metal parts in close proximity under spring tension.

An object of the invention is to provide a fastener of this general type which has a minimum of simplified parts, which is economical to manufacture and to assemble, which also may be easily and efficiently applied in place upon the parts to be fastened by modern manufacturing practices, and wherein the fastened parts are quickly detachable and then replaceable to prior fastened position with little effort and simple tools.

An important object of the invention is an arrangement of parts in such a fastener which permits the use of an integral die cut and die formed bracket means with which a spring is associated, and which in a single metal stamping provide plate attachment means, spring holding means, spring guiding means, and spring travel limit means.

With the above and other objects in view, my invention will be readily understood from a preferred illustrative embodiment hereinafter described in connection with the accompanying drawing which, it is to be understood, is not to be deemed as limiting the scope of my invention.

In the figures:

Fig. I is a section of a fastener embodying my invention with the parts in operative position but not in interlocked position.

Fig. II is a bottom plan view of the fastener illustrated in Fig. I.

Fig. III is a section similar to Fig. I with the fastener parts in interlocked position.

Fig. IV is a section taken on the line 4—4 in Fig. II.

Fig. V is a fragmentary perspective of a portion of the metal stamp bracket means.

The embodiment of my invention shown in the above identified figures may be said to diagrammatically illustrate the connection of two plate members 10 and 12 of an airplane cowling assembly which is desired to hold in close proximity and relatively fixed position under spring tension by means of a fastener or coupling generally indicated as 14.

The fastener 14 comprises two main parts, namely a rotatable stud member 16 and a cooperative receptacle or bracket member 18 for detachable interlocking engagement therewith.

The rotatable stud member will normally be provided with a flat head member 20 having therein a slot 22 so that the stud member 16 may be rotated by means of a coin or screw driver or other tool being inserted in slot 22. Also stud member 16 will be provided on its opposite end, preferably by a simple milling operation, with a spiral slot 24, ending as indicated in a detent 26. The stud member 16 may be rotatably connected to sheet 10 by virtue of a grommet 28 or other suitable fastening means, in such fashion that the outer portion of stud head 20 will be approximately flush with the outer portion of member 10. Also grommet 28, as shown, will normally be slidably engaged in reduced portion 30 of the shank of stud 16.

As is well understood in the art, sheet members 10 and 12 will be provided with the necessary registering holes 31 and 34 by means of conventional punch mechanisms and downwardly angulated flange member 32 will be provided in sheet member 10 by conventional forming die mechanisms associated with said punch mechanisms.

Cooperating with rotatable stud member 16 is the receptacle member 18 which will normally be formed as indicated with a collar member 36 provided with a central axial opening or bore 38 and preferably having its external longitudinal wall generally tapered or formed in the shape of an inverted truncated cone as shown in Fig. I.

The upper portion of receptacle 18 will be provided with a flat or horizontal flange 40 having rivet holes 42 stamped therein thus permitting receptacle 18 through its flange 40 to be securely riveted by rivets 43 to plate member 12.

As shown in the drawing, a coil spring 44 is preferably arranged so that its top or upper end coil 46 may be held in place by metal tabs or turn-backs 48 die stamped from bracket flange 40. Preferably the turn-backs will be so cut as to form a continuation of the rivet holes 42 in flange 40 thus permitting speed in production. The spring 44 is coiled around the lower tapered surface of die stamped receptacle or bracket 18 and a cross-bar portion 50 of the end of said spring 44 is disposed centrally across the lower end ring of the cylindrically coiled spring and may be spot-welded as at 52 to the adjacent coil 54, thus forming a cross-bar member to cooperate with spiral slot 24. In place of the spot-welding, the free end could well be led further outwardly and then curved upwardly around coil 54 in order to restrict its movement or terminated flush with the outer edge of spring 44.

Cross-bar portion 50 of spring 44 when its upper coil 54 has been associated with flange 40 by tabs 48 will normally ride in transverse slots or guides 56 formed in the lower portion of receptacle 18, thereby preventing rotation of spring 44.

With the parts arranged as shown in Fig. I rotation of stud 16 will cause cross-bar member or portion 50 of spring 44 to ride upwardly in slot 24 of stud 16 and continued rotation will result in the deposition of the bar member in detent 26, in which position projection member 58 of the detent will hold the cross-bar member 50 in firm interlocked position and therefore, the two cooperating fastener parts 16 and 18 will be held in firm detachable interlocked connection under spring tension, with the parts in the general relationship indicated in sectional Fig. IV.

As will be apparent from a viewing of Fig. I, the bevelled or downwardly angulated flange member 32 materially cooperates with the marginal portion of the opening in plate 12 to operate as a centering means for associating the two main parts of the fastener both when the parts are to be fastened together and also as a bevelled centering means and bearing surface to overcome lateral stresses and vibratory movements of the fastener with the parts interlocked and with the cowling subjected to the movements attendant to its normal uses. Alternately if desired, in a different arrangement of parts member 32 could be made to bear on cone shaped collar member 36 for centering purposes.

It will be recognized by those skilled in the art that my improved fastener comprises two main parts of simple construction, namely a rotatable stud and a cooperating receptacle member and that the stud is simple to manufacture and to position in place in cowling member 10, as indicated. It will also be recognized that the integral receptacle or bracket member 18 is relatively simple to form by modern manufacturing stamping practices and that spring member 44 may be readily assembled thereon by having an operator force tabs 48 upon spring coil 48. The parts may be arranged so that a quarter turn of stud member 16 will place cross-bar member 50 of spring 44 in detent 26 of slotted end 24 of the stud member and that with the parts in such relationship that spring 44 is under compression and further that any tendency to separate sheets 10 and 12 will result in further compression of spring member 44 until cross-bar member 50 stops at the innermost recesses or bottom of slots or guides 56 and that thereafter the full load is assumed by crossbar 50, collar member 36 and stud member 16. This permits a nice adjustment of tolerances for limiting the travel of parts 10 and 12, as the load may first be assumed by the spring and later, as parts 10 and 12 separate further, the full load is taken up by substantially non-flexible parts. Alternatively the parts may be arranged with deeper slots 56 so that when the spring is compressed one coil adjacent the other, the load is assumed by the coils, cross-bar and stud.

It will be further recognized that the embodiment of my invention above described was illustrative only and that substitutions of materials and parts, or reversals of parts may be made without avoiding the scope of my invention which is defined in the following claims.

What I claim is:

1. A detachable fastener for maintaining two parts in close proximity under spring tension, which includes a rotatable stud member for connection to one part, provided with a spiral slot in one end and a detent at the inner recess of said slot, and a cooperating receptacle member for connection to the second part, said receptacle member including a spring tensioned cross-bar member adapted to be detachably fastened within the detent of said spiral slot and guide means for said cross-bar member.

2. A detachable fastener for maintaining two parts in close proximity under spring tension, which includes a rotatable stud member for connection to one part, provided with a spiral slot in one end and a detent at the inner recess of said slot, and a cooperating receptacle member for connection to the second part, said receptacle member having longitudinal slots at one end thereof and having a cylindrically shaped coil spring mounted thereon, and including a cross-bar member associated with said spring and adapted to be detachably fastened within the detent of said spiral slot and to be guided by said longitudinal slots.

3. A detachable fastener for maintaining two parts locked in close proximity under spring tension, which includes a rotatable stud member for connection to one part, provided with a spiral slot, in one end and a detent at the inner recess of said slot and a cooperating receptacle member for connection to the second part of generally truncated cone shape having a longitudinal opening therethrough, said receptable member including a tapered collar member, a coil spring mounted thereon, a cross-bar member associated with said spring and adapted to be detachably locked within the detent of said spiral slot, and relatively inflexible means to limit the travel of said cross-bar member.

4. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring member encircling said collar member and associated therewith, a cross-bar member associated with said spring member and adapted to detachably lock in said detent of said spiral slot with the spring under compression when the fastener stud and receptacle members are locked, and travel limit means for restricting the travel of said cross-bar member.

5. A detachable fastener for maintaining two parts locked in close proximity under spring tension, which includes a rotatable stud member for connection to one part, provided with a spiral slot in one end and a detent at the inner recess of said slot and a cooperating receptacle member for connection to the second part, said receptacle member including a collar member, a spring member encircling said collar member and associated therewith and a cross-bar member associated with said spring member and forming an integral part thereof and adapted to detachably lock in said detent of said spiral slot with the spring under compression when the fastener stud and receptacle members are locked.

6. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring member encircling said collar member and associated therewith, a cross-bar member associated with said spring member and adapted to detachably lock in said detent of said spiral slot with the spring under compression when the fastener stud and receptacle members are locked and guideways for guiding said cross-bar member.

7. A detachable fastener for maintaining two parts locked in closed proximity under spring tension, which includes a rotatable stud member for connection to one part, provided with a spiral slot in one end and a detent at the inner recess of said slot, and a cooperating receptacle member including a collar member, a spring member encircling said collar member and associated therewith, a cross-bar member associated with said spring member and forming an integral part thereof and adapted to detachably lock in said detent of said spiral slot with the spring under compression when the fastener stud and receptacle members are locked, and a longitudinal slotted guide in said collar member for guiding said cross-bar member.

8. A detachable fastener for maintaining two parts locked in close proximity under spring tension, which includes a rotatable stud member for connection to one part, provided with a spiral slot in one end and a detent at the inner recess of said slot, and a cooperating receptacle member for connection to the second part, said receptacle member including a collar member, a spring member associated with said collar member, a cross-bar member associated with said spring member and adapted to detachably lock in said detent of said spiral slot with the spring under compression when the fastener stud and receptacle members are locked, and a longitudinal slotted guide in said collar member for guiding said cross-bar member and for limiting its travel longitudinally of said collar member.

9. A detachable fastener for maintaining two parts locked in close proximity under spring tension, which includes a rotatable stud member for connection to one part, provided with a spiral slot in one end and a detent at the inner recess of said slot and a cooperating receptacle member for connection to the second part, said receptacle member including a base member, a collar member integral therewith having a central opening and an end portion having a slotted vertically disposed guide, a spring member associated with said spring member and adapted to ride upwardly and downwardly in said slotted guide, said cross-bar member adapted to detachably lock in said detent of said spiral slot with the spring under compression when the fastener stud and receptacle members are locked, and said cross-bar normally being positioned within said guide of said collar member.

10. A detachable fastener for maintaining two parts locked in close proximity under spring tension, which includes a rotatable stud member for connection to one part, provided with a spiral slot in one end and a detent at the inner recess of said slot and a cooperating receptacle member for connection to the second part, said receptacle member including a base member, a collar integral therewith having a central opening and an end portion having a slotted vertically disposed guide, a spring member associated with said collar member, means integral with said base member for connecting the spring member to said base member, and a cross-bar member associated with said spring member and adapted to ride upwardly and downwardly in said slotted guide, said cross-bar member adapted to detachably lock in said detent of said spiral slot with the spring under compression when the fastener stud and receptacle members are locked and said cross-bar normally being positioned within said guide of said collar member.

EDWARD L. MACK.